(12) United States Patent
Astigarraga et al.

(10) Patent No.: US 10,229,230 B2
(45) Date of Patent: Mar. 12, 2019

(54) SIMULATING A LARGE NETWORK LOAD

(71) Applicant: INTERNATIONAL BUSINESS MACHINES CORPORATION, Armonk, NY (US)

(72) Inventors: Tara Astigarraga, Fairport, NY (US); Christopher V. DeRobertis, Hopewell Junction, NY (US); Louie A. Dickens, Tucson, AZ (US); Michael E. Starling, Bonsall, CA (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 14/590,478

(22) Filed: Jan. 6, 2015

(65) Prior Publication Data

US 2016/0196366 A1    Jul. 7, 2016

(51) Int. Cl.
*G06G 7/62* (2006.01)
*G06F 17/50* (2006.01)

(52) U.S. Cl.
CPC .................. *G06F 17/5009* (2013.01)

(58) Field of Classification Search
None
See application file for complete search history.

(56) References Cited

U.S. PATENT DOCUMENTS

| | | | |
|---|---|---|---|
| 5,610,745 A * | 3/1997 | Bennett | H04L 49/107 370/232 |
| 6,192,406 B1 * | 2/2001 | Ma | H04L 47/10 709/226 |
| 6,535,515 B1 * | 3/2003 | Hasegawa | H04L 1/1809 370/395.52 |
| 6,751,219 B1 * | 6/2004 | Lipp | H04L 49/201 370/390 |
| 7,774,444 B1 * | 8/2010 | George | H04L 67/1097 709/217 |
| 8,098,658 B1 * | 1/2012 | Ranganathan | H04L 45/00 370/254 |
| 8,107,458 B1 * | 1/2012 | Ranganathan | H04L 41/12 370/254 |

(Continued)

OTHER PUBLICATIONS

Yin et al. Storage Area Network Extension over Passive Optical Networks (S-PONs) IEEE Applications & Practice Topics in Optical Communications, 2008, pp. 44-52 (Year: 2008).*

(Continued)

*Primary Examiner* — Aniss Chad
*Assistant Examiner* — Cuong V Luu
(74) *Attorney, Agent, or Firm* — ZIP Group PLLC (57) ABSTRACT

A SAN testing application may be provided to restrict the utilization of one or more SAN device resources. The restricted, or throttled, resource(s) enables a smaller load to stress a SAN switch to effectively emulate a larger load. Resource throttling may, for example, result in the rapid filling of switch buffers and corresponding computational stress. The emulated load allows for all ports of a SAN switch to be simultaneously tested without the need or expense of a large number computing devices stressing the SAN. The SAN device with throttled resource(s) may be located within a testing environment or may be located in a functioning SAN to determine SAN bottlenecks prior to critical loading.

3 Claims, 6 Drawing Sheets

(56) References Cited

U.S. PATENT DOCUMENTS

| | | | |
|---|---|---|---|
| 8,379,658 | B2 | 2/2013 | Schmidt et al. |
| 8,593,964 | B1 | 11/2013 | Sinha et al. |
| 9,118,698 | B1* | 8/2015 | Radovanovic ...... H04L 67/1097 |
| 9,495,486 | B1* | 11/2016 | Aluru .................. G06F 17/5009 |
| 2002/0019958 | A1 | 2/2002 | Cantwell et al. |
| 2002/0170004 | A1 | 11/2002 | Parrett et al. |
| 2003/0123468 | A1* | 7/2003 | Nong .................. H04L 12/5601 370/412 |
| 2004/0246897 | A1* | 12/2004 | Ma .......................... H04L 47/10 370/230 |
| 2005/0071446 | A1* | 3/2005 | Graham ............. H04L 12/4641 709/223 |
| 2007/0067296 | A1* | 3/2007 | Malloy ................. H04L 41/145 |
| 2007/0088795 | A1* | 4/2007 | Dunbar .............. H04L 67/1097 709/217 |
| 2008/0089320 | A1* | 4/2008 | Dehaan ................ H04L 41/145 370/360 |
| 2009/0043880 | A1* | 2/2009 | Dickens .................. H04L 47/10 709/224 |
| 2010/0049942 | A1* | 2/2010 | Kim .................. G06F 15/17375 712/29 |
| 2011/0103259 | A1* | 5/2011 | Aybay ..................... H04L 49/35 370/254 |
| 2011/0122872 | A1* | 5/2011 | Balay ...................... H04L 12/18 370/390 |
| 2014/0064269 | A1* | 3/2014 | Hamdi ................... H04L 49/25 370/355 |
| 2014/0153573 | A1* | 6/2014 | Ramesh ................ H04L 45/748 370/392 |
| 2014/0351443 | A1* | 11/2014 | Tang ................... G06F 9/45533 709/226 |
| 2017/0353401 | A1* | 12/2017 | Kim ..................... G06F 9/45533 |

OTHER PUBLICATIONS

Mellish et al. Implementing Fibre Channel Attachment on the ESS IBM, Sep. 2000 (Year: 2000).*

Molero et al. Modeling and Simulation of Storage Area Networks IEEE 2000 pp. 307-314.*

Caminero et al. Tuning Buffer Size in the Multimedia Router (MMR) IEEE 2001 pp. 1-8.*

Pun et al. Extended Distance Technologies EMC2 Techbooks Version 1.4 2011.*

Das et al. Broadcom Smart-Buffer Technology in Data Center Switches for Cost-Effective Performance Scaling of Cloud Applications Apr. 2012 pp. 1-15.*

Scheible, John, "FC-LS default Login parameters clarification," Accredited Standards Committee INCITS, National Committee for Information Technology Standards, Feb. 5, 2004.

Zhang, H. et al.; "Fibre channel storage area network design for an acoustic camera system with 1.6 Gbits/s bandwidth"; Proceedings of IEEE Region 10 International Conference on Elecrtrical and Electronic Technology; TENCON 2001; pp. 143-148; vol. 1; IEEE. 2001.

Mellish, B. et al.; "Implementing Fibre Channel Attachment on the ESS"; IBM Corporation, http://www.ibm.com/redbooks/sg24-6113-00 . . . Sep. 2000.

Wood, E. et al.; "XIV Storage System: A look into Fibre Channel and iSCSI Performance"; IBM Corporation, http://www.ibm.com/redbooks/redp5057-00 . . . 2014.

* cited by examiner

SIMULATING A LARGE NETWORK LOAD

FIELD OF THE INVENTION

Embodiments of the invention generally relate to computer systems and more particularly to simulating a large network load in a storage area network (SAN).

DESCRIPTION OF THE RELATED ART

As the throughput of today's SAN switches increase, it is becoming more difficult to produce an adequate load upon the switch or switches in a test environment. Testing loaded switches may be desirable to find switch problems that may be encountered in a SAN where hundreds or thousands of servers are loading the SAN switches. Testing loaded switches may also be desirable to produce a stressed switch which may result in altered timings and or unique errors that surface under higher load.

Altered timing may result when a fully loaded switch cannot send frames as fast as the switch receives them. The fully loaded switch is forced to buffer frames, which, alters the timing of frame delivery. Unique errors may be seen as a direct result of the load. For example, stressed switches may drop frames when they cannot be delivered within a threshold time. As a result, multiple end devices may be performing error recovery processes and the stress switch may corrupt frames.

One solution to test loaded SAN switches is to add a large number of servers and storage devices to a SAN to produce a large enough load. Another current solution to test a loaded SAN switch is to utilize dedicated testing equipment designed to produce load on a port by port basis, such as load test equipment manufactured by JDSU Corporation.

SUMMARY

In an embodiment of the present invention, a method of simulating a large storage area network (SAN) load includes receiving an instruction with a SAN switch that identifies a SAN switch resource and an utilization metric associated with the SAN switch resource, restricting the utilization of the SAN switch resource as enumerated by the utilization metric, receiving a plurality of frames upon a plurality of SAN switch ports, and emulating a large SAN load by buffering the received frames within the SAN switch.

In another embodiment of the present invention, a method of simulating a large storage area network (SAN) load includes receiving an instruction with a SAN switch chassis that identifies a SAN switch chassis resource and an utilization metric associated with the SAN switch chassis resource, restricting the utilization of the SAN switch chassis resource as enumerated by the utilization metric, receiving a plurality of frames upon a plurality of SAN switch ports of a SAN switch within the SAN switch chassis, and emulating a large SAN load by buffering the received frames within the SAN switch.

In yet another embodiment of the present invention, a computer program product for simulating a large storage area network (SAN) load includes a computer readable storage medium having program instructions embodied therewith readable by a SAN switch to cause the SAN switch to receive an instruction that identifies a SAN switch resource and an utilization metric associated with the SAN switch resource, restrict the utilization of the SAN switch resource as enumerated by the utilization metric, receive a plurality of frames upon a plurality of SAN switch ports, and emulate a large SAN load by buffering the received frames within the SAN switch.

These and other embodiments, features, aspects, and advantages will become better understood with reference to the following description, appended claims, and accompanying drawings.

DETAILED DESCRIPTION

Embodiments of the invention generally relate to computer systems and more particularly to simulating a large network load in a SAN. More particularly, a SAN testing application may be provided to restrict the utilization of one or more SAN device resources. The restricted, or throttled, resource(s) enables a smaller load to stress a SAN switch to effectively emulate a larger load. Resource throttling may, for example, result in the rapid filling of switch buffers and corresponding computational stress. The emulated load allows for all ports of a SAN switch to be simultaneously tested without the need or expense of a large number computing devices stressing the SAN. Further, the SAN device with throttled resource(s) may be located within a testing environment or may be located in a functioning SAN to determine SAN bottlenecks prior to critical loading.

Figure 1:
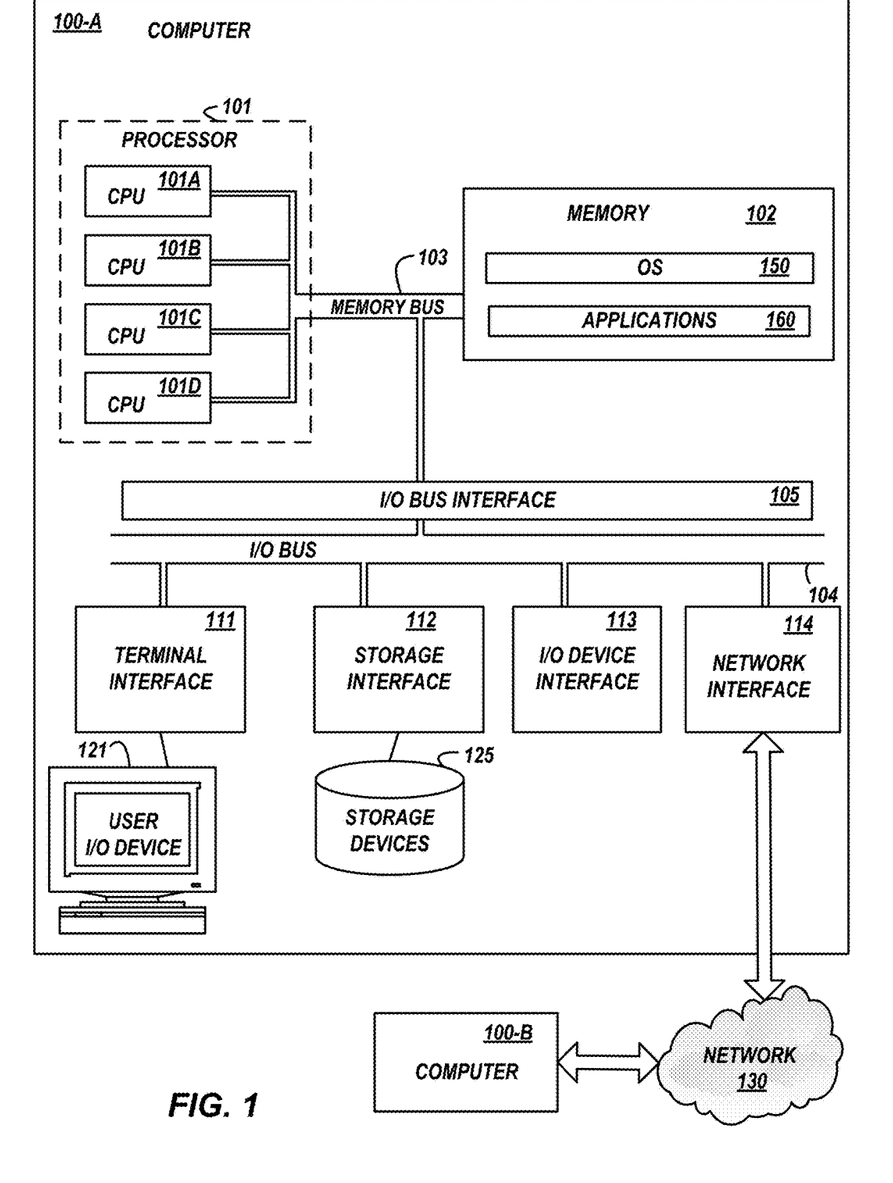
FIG. 1 illustrates a high-level block diagram of an exemplary computer system for implementing various embodiments of the invention.

Referring to the FIGs., wherein like numbers denote like parts throughout the several views, FIG. 1 depicts a high-level block diagram representation of a computer 100-A connected to another computer 100-B via a network 130, according to an embodiment of the present invention. The term "computer" is used herein for convenience only, and in various embodiments is a more general data handling system, such as a mobile phone, tablet, server computer, storage system, etc. The mechanisms and apparatus of embodiments of the present invention apply equally to any appropriate data handling system.

The major components of the computer 100-A may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer 100-A contains one or more general-purpose programmable central processing units (CPUs) 101A, 101B, 101C, and 101D, herein generically referred to as the processor 101. In an embodiment, the computer 100-A contains multiple processors typical of a relatively large system; however, in another embodiment the computer 100-A may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100-A, and may also include the virtual memory of other computer systems coupled to the computer 100-A or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, an application 160, etc. are illustrated as being contained within the memory 102 in the computer 100-A, in other embodiments some or all of them may be on different computer systems and may be accessed remotely, e.g., via the network 130. The computer 100-A may use virtual addressing mechanisms that allow the programs of the computer 100-A to behave as if they only have access to a large, single storage entity instead of access to multiple, smaller storage entities. Thus, while operating system 150, application 160, or other program instructions are illustrated as being contained within the main memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGs. When such program instructions are able to be run by the processor 101, such computer becomes a particular machine configured to carry out such instructions. For example, an application may restrict the utilization of one or more computer 100-A resources and or computer 100B resources may be loaded upon computer 100-A. Further, a storage system application may be loaded upon one or more computers 100-B that allows the computer 100-A to storage data to computer 100-B over the network 130.

In some embodiments, one or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image may be displayed to a user. The processor 101 and GPU may be discrete components or may be integrated into a single component.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100-A, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.).

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device such as solid state drives (SSDs) or optical disk drives. The contents of the main memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

The I/O device interface 113 provides an interface to any of various other input/output devices. The network adapter 114 provides one or more communications paths from the computer 100-A to other data handling devices such as numerous other computers; such paths may comprise, e.g., one or more networks 130. For example, network adapter 114 may be a SAN adapter that communicatively connects one or more storage devices 125 of computer system 100-B.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100-A may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol on another bus. Therefore, network interface 114 may connect a wide variety of devices to computer 100-A and to each other such as, but not limited to, tape drives, a SAN network (e.g. switches, storage systems, etc.), optical drives, printers, disk controllers, other bus adapters, PCI adapters, workstations using one or more protocols including, but not limited to, Token Ring, Gigabit Ethernet (GbEN), Ethernet, Fibre Channel, Fibre Channel over Ethernet (FCoE), SSA, Fiber Channel Arbitrated Loop (FCAL), Serial SCSI, Ultra3 SCSI, iSCSI, Infiniband, FDDI, ATM, 1394, ESCON, wireless relays, Twinax, LAN connections, WAN connections, high performance graphics, etc. In embodiments, network 130 is a SAN or other storage network.

Though shown as distinct entities, the multiple I/O interface units 111, 112, 113, and 114 or the functionality of the I/O interface units 111, 112, 113, and 114 may be integrated into a similar device.

In various embodiments, the computer 100-A is a multi-user mainframe computer system, a single-user system, a server computer, storage system, or similar device that has little or no direct user interface, but receives requests from other computer systems (clients). In other embodiments, the computer 100-A is implemented as a desktop computer, portable computer, laptop or notebook computer, tablet computer, pocket computer, telephone, smart phone, pager, automobile, teleconferencing system, appliance, or any other appropriate type of electronic device.

In embodiments, network 130 may be one or more suitable networks or combination of networks and may support any appropriate protocol suitable for communication of data and/or code to/from the computer 100-A and at least the computer 100-B. For example, network 130 may include a communication network (e.g., internet) and network 130 may include a storage network (e.g., SAN). In various embodiments, the network 130 may represent a data handling device or a combination of data handling devices, either connected directly or indirectly to the computer 100-A. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100-A. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc. Computer 100-B may include similar, less, or additional components as compared with computer 100-A. In specific embodiments, computer 100-A may be a server, computer 100-B may be a storage system that may store data from computer 100-A, and network 130 includes a SAN to provide for the storage of data from server 100-A upon storage system 100-B.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
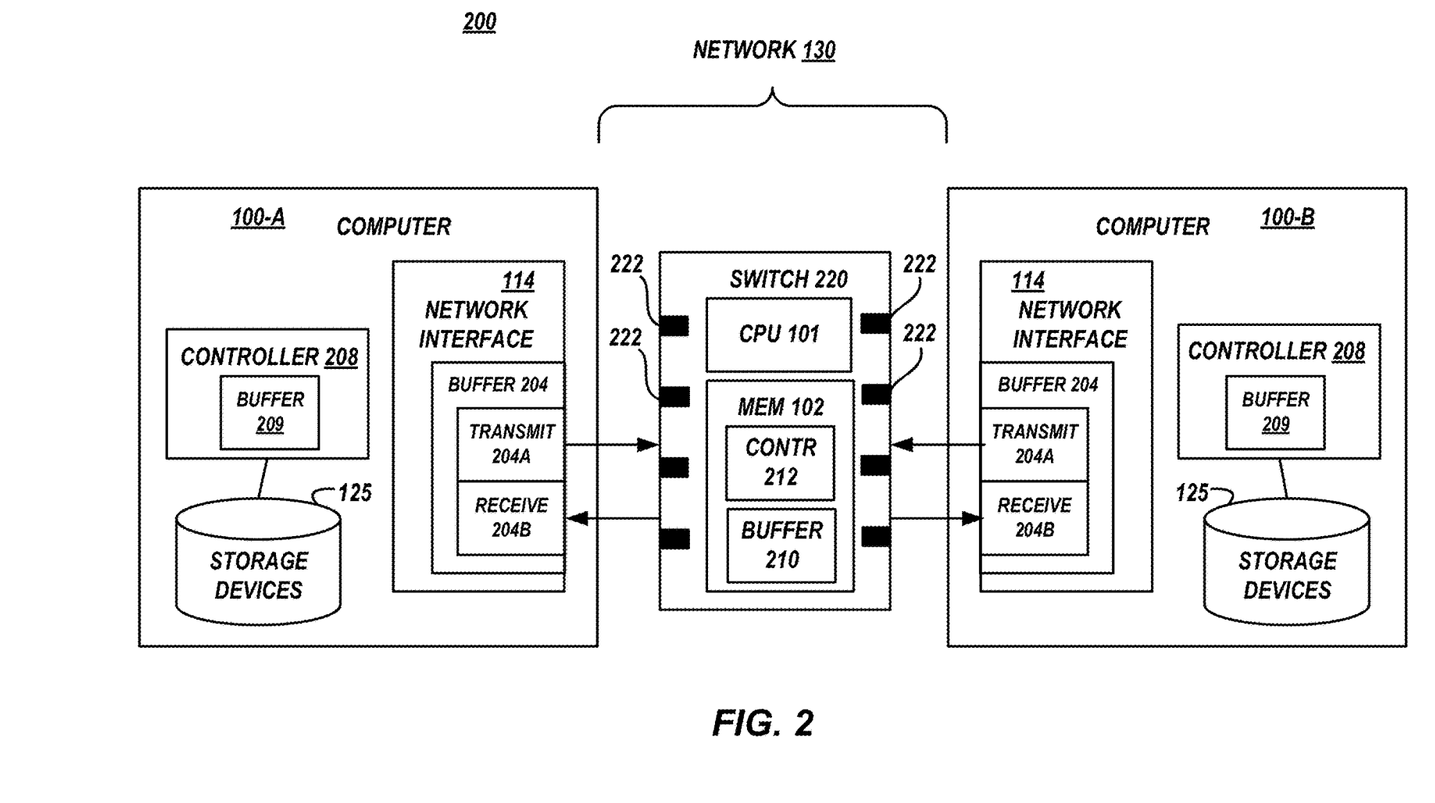
FIG. 2 illustrates an exemplary SAN, according to various embodiments of the present invention.

FIG. 2 illustrates a SAN environment 200 including a SAN network 130 that generally provides access to consolidated, block level data storage. SAN environment 200 may be used to enhance the storage capabilities of numerous computers. For example, storage devices, e.g., disk arrays, tape libraries, and optical jukeboxes, etc. within computer 100-B may appear like locally attached devices 125 to the operating system 150 of computer 100-A. SAN environment 200 may be used to increase storage capacity utilization, since multiple computers may consolidate storage space onto SAN storage devices 125. Common uses of a SAN environment 200 include provision of transactional accessed data that require high-speed block-level access to the hard drives such as email servers, databases, and high usage file servers.

SAN environment 200 may also provide the sharing of storage space to simplify storage administration. The SAN environment 200 could span a distant physical distance between the computer 100-A and the SAN storage devices 125 attached via the SAN network 130. This enables storage replication either implemented by disk array controllers, by server software, or by specialized SAN devices, such as a Fibre Channel switch. Some SANs 130 use the SCSI protocol for communication between computers 100 and SAN attached devices 125. A mapping layer to other protocols may be used to form SAN specific network 130, such as ATA over Ethernet (AoE), SCSI over Fibre Channel, Fibre Channel over Ethernet (FCoE), ESCON over Fibre Channel (FICON), HyperSCSI, iFCP, SANoIP' iSCSI, etc.

SAN environment 200 often includes a fabric topology which is an infrastructure specially designed to route storage communications. A typical SAN fabric is made up of one or more switches 220.

In a particular embodiment, the SAN network 130 includes SAN storage devices 125 attached to one or more computers via one or more switches 220. Computer 100-A, and 100-B may include a controller 208 such as a storage controller that may manage or control the loading of data to SAN attached storage devices 125. The controller 208 may be connected to I/O bus 104, be included within e.g., storage interface 112, I/O interface 113, network interface 114, implemented by processor 101, etc. In certain embodiments, controller 208 is an application 160. In other embodiments, controller 208 is processing unit such as CPU 101, programmable array, etc.

In embodiments, the network interface 114 may further include a buffer 204 to store data to be transmitted by a transmit module 204A or to store data received from receive module 204B. Similarly, controller 208 may further include a buffer 209 to temporarily store data that will be loaded upon SAN storage devices 125 as directed by controller 208 or to temporarily store data from SAN storage devices 125 for further processing (e.g., provide data from SAN storage device 125 to a requesting computer 100-A via SAN 130, etc.). Likewise, switch 220 may include a buffer 210 for temporarily storing received data that is to be stored upon one or more SAN storage devices 125 or for temporarily storing data received from SAN storage devices 125 that is to be provided to a requesting device. The data that moves though the switch 220 may be managed by controller 212. Controller 212 may be an application 160 or a processing unit such as CPU 101, programmable array, etc. Switch 220 may further include a plurality of ports 222 that provide for a communication interface with other SAN environment 200 devices. In addition to processor 101 and memory 102, switch 220 may include similar components as e.g., computer 100-A.

Figure 3:
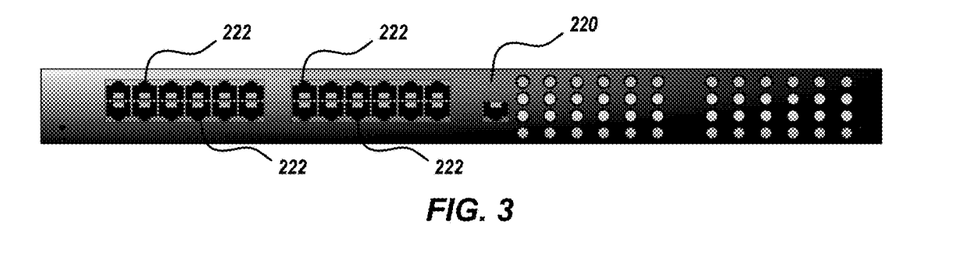
FIG. 3 illustrates an exterior view of a SAN switch, according to various embodiments of the present invention.

FIG. 3 illustrates an exterior view of SAN switch 220. In an embodiment, the SAN testing application is provided to restrict the utilization of one or more SAN switch 220 resources or components. For example, if a 20% load is being implemented upon a switch 220 using all of its capabilities the load may not be sufficient to sufficient stress the switch 220 to expose possible defects. However, if we were to drive that same 20% load while limiting the switch to use only 28.57% of its total resource capacity, the 20% actual-load becomes an emulated 70% equivalent-load (20/28.54=70%). A non exhaustive list of potential switch 220 resources that may be throttled are CPU 101, memory 102, buffer 210, number of buffer credits per port 222, capacity per port on demand (POD), etc.

Figure 4:
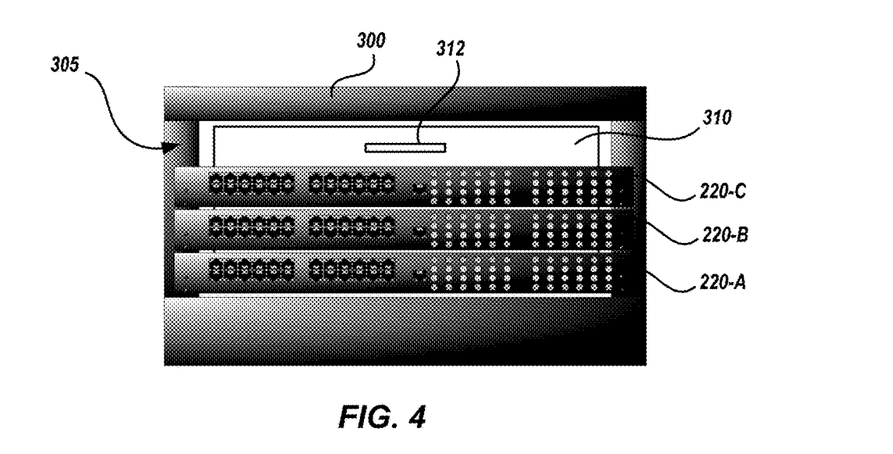
FIG. 4 illustrates an exterior view of a chassis including multiple SAN switches, according to embodiments of the present invention.

FIG. 4 illustrates an exterior view of a chassis 300 including multiple SAN switches 200-A, 200-B, and 200C. The chassis 300 may include numerous slots 305 that which respective switches 220 may be inserted. In some implementations, multiple switches 220 may be connected by a backplane 310 that includes a connector 312. In these implementations respective switches 220 may engage with respective connectors 312. In another embodiment, the SAN testing application is provided to restrict one or more resources within a chassis 300. A non exhaustive list of potential chassis 300 resources that may be throttled are capacity per slot 305 (e.g., capacity per connector 312, capacity per switch 220, etc.), overall capacity per chassis 300, etc.

Generally, the SAN testing application may control the accessibility and usability of one or more resources within a SAN environment 200. The application allows an administrator to indicate one or more resources and to specify the applicable amount, space, quantity, speed, proportion, or other applicable performance metric of the specified resources for utilization. Once the utilization metric of the specified resource is received, the SAN testing application may hold, block, or otherwise restrict the applicable remaining amount, increase or decreases the latency of the resource, etc. of the specified resource for a duration of a SAN testing period. For example, the size of buffer 210 may be reduced, the clock speed of the CPU 101 may be increased, the number of buffer credits may be reduced, etc. The altered utilizations of the resource(s) enable a smaller load to stress the SAN switch 220 to effectively emulate a larger load. In a particular example, the size of buffer 210 may be limited and such resource throttling would result in the rapid filling of the remaining buffer 210 and cause a corresponding computational stress. This emulated effectively larger load allows for all ports 222 of the SAN switch 220 to be simultaneously tested without the need or expense of a large number computing devices stressing the SAN environment 200.

Figure 5:
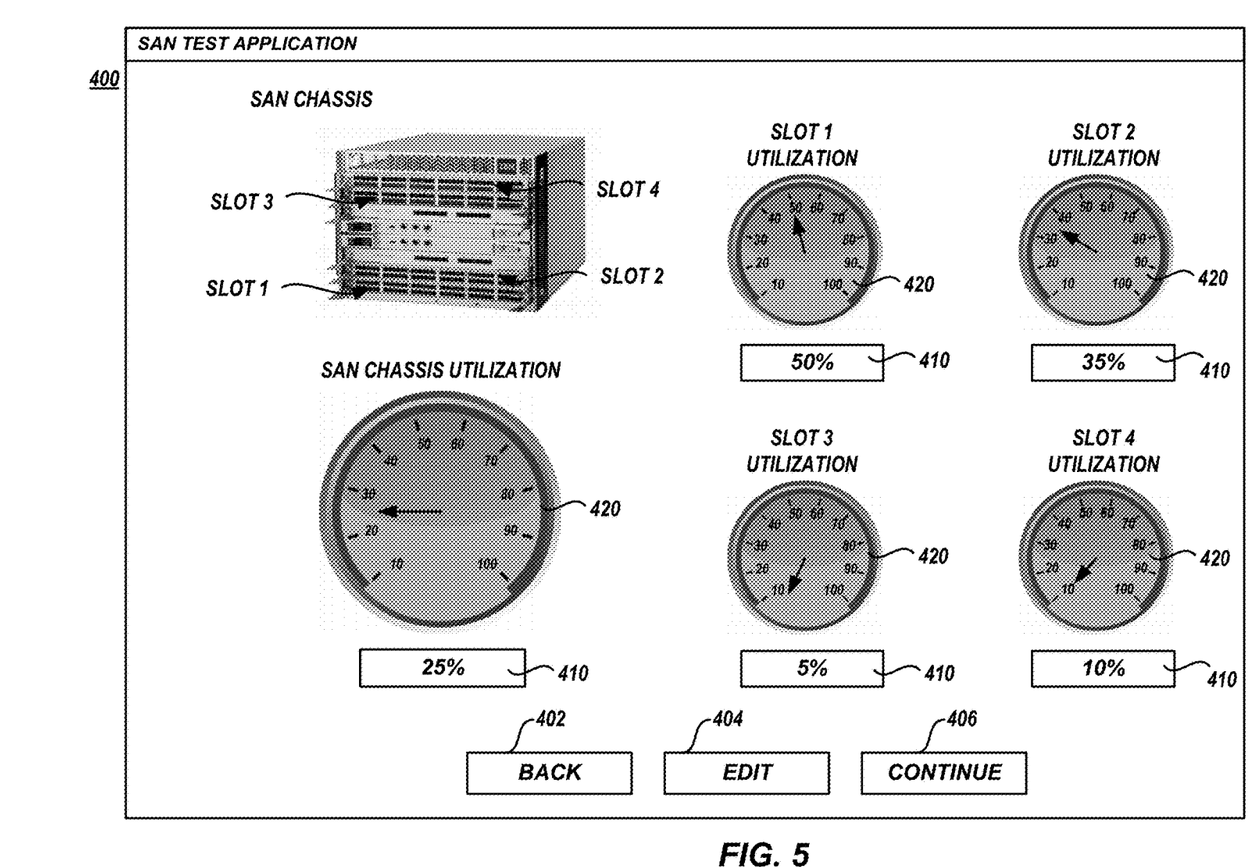
FIG. 5 illustrates an exemplary SAN testing application interface to simulate a large network load, according to various embodiments of the present invention.

FIG. 5 illustrates an exemplary SAN testing application interface 400 to simulate a large network load, according to various embodiments of the present invention. Interface 400 may be provided upon user I/O device 121 and may include a hardware image of a chassis 300. Further, interface 400 may include navigation objects 402, 404, and or 406. Interface 400 may also include receiving fields 410 that which an administrator may input various utilization metrics. Interface 400 may also include a utilization icon 420 that provides an indication of the utilization of an associated resource. The user interface 400 may be a graphic user interface displayed upon a display or touch screen. Interface 400 may display chassis 300 level resources and may allow for the administrator to provide one or more utilization metrics to associated resources.

In a particular implementation, the administrator may indicate that a first slot 305 is to be utilized at 50% utilization capacity in order to simulate a larger network load in a SAN environment 200. In other words, 50% of the capacity (e.g., Gb/slot, etc.) of the first slot 305 is blocked from being utilized during the SAN testing period. In this manner, a similar network load adds twice the amount of computational stress to the throttled first slot 305. Likewise, the administrator may indicate that a second slot 305 is to be utilized at 35% utilization capacity in order to simulate a larger network load in a SAN environment 200, a third slot 305 is to be utilized at 5% utilization capacity in order to simulate a larger network load in a SAN environment 200, and a fourth slot 305 is to be utilized at 10% utilization capacity in order to simulate a larger network load in a SAN environment 200.

In another implementation, the administrator may indicate that the overall chassis 300 is to be utilized at 25% utilization capacity (e.g., Tb/chassis, etc.) in order to simulate a larger network load in a SAN environment 200. In other words, 75% of the capacity of chassis 300 is blocked from being utilized during the SAN testing period.

Figure 6:
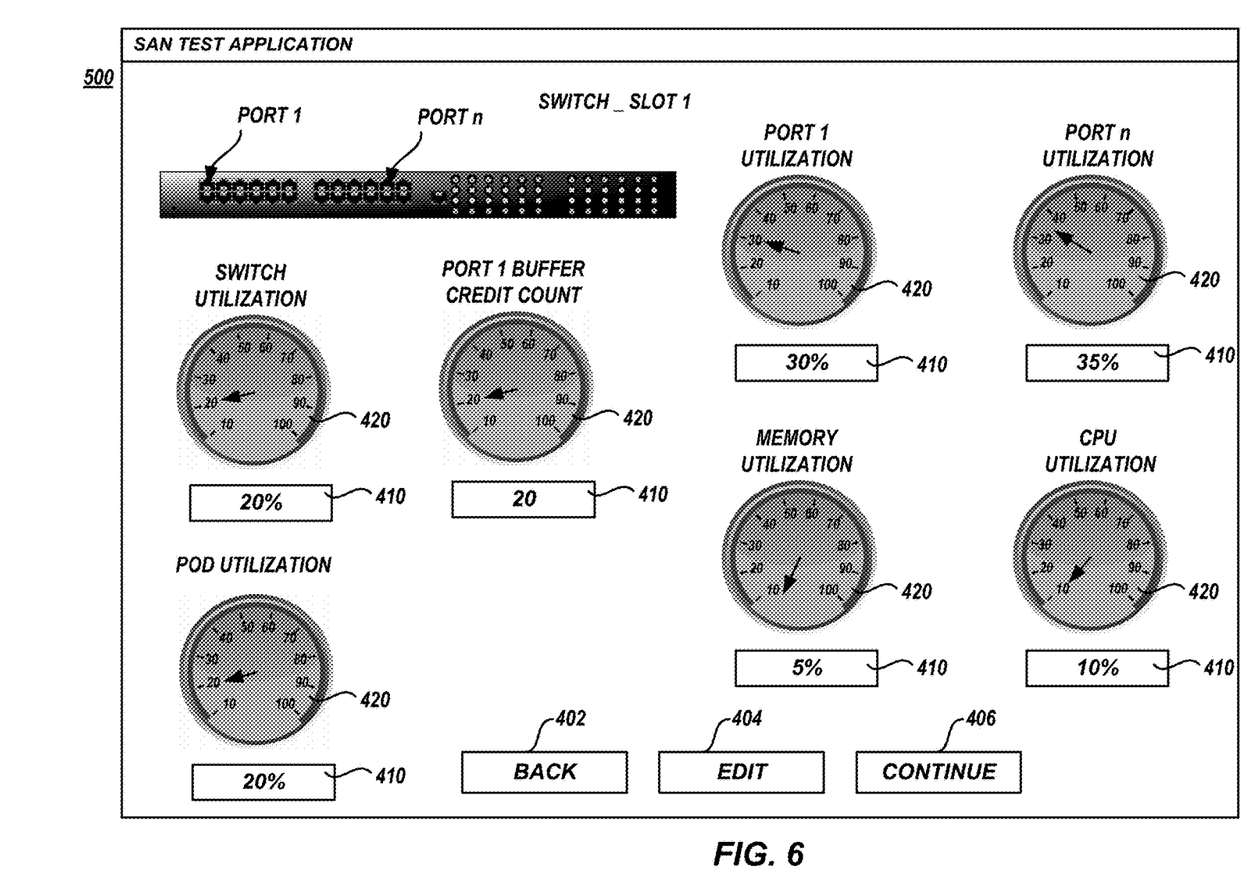
FIG. 6 illustrates an exemplary SAN testing application interface to simulate a large network load, according to various embodiments of the present invention.

FIG. 6 illustrates an exemplary SAN testing application interface 500 to simulate a large network load, according to various embodiments of the present invention. Interface 500 may be provided upon user I/O device 121 and may include a hardware image of a SAN switch 220. Interface 500 may include navigation objects 402, 404, and or 406 and may also include receiving fields 410 that which an administrator may input various utilization metrics. Interface 500 may also include one or more utilization icons 420 to provide an indication of the utilization of an associated resource. The user interface 500 may be a graphic user interface displayed upon a display or touch screen. Interface 500 may display SAN switch 220 level resources and may allow for the administrator to provide one or more utilization metrics to an associated resource.

In a particular implementation, the administrator may indicate that a first port 222 is to be utilized at 30% utilization capacity (e.g., receive port, transmit port may be throttled, buffer 210 partition assigned to the first port may be limited, etc.) in order to simulate a larger network load in a SAN environment 200. In other words, 70% of the capacity of the first port 222 is blocked from being utilized during the SAN testing period. Likewise, the administrator may indicate that an n port 222 is to be utilized at 35% utilization capacity in order to simulate a larger network load in a SAN environment 200.

In another implementation, the administrator may indicate that SAN switch 220 memory 120 is to be utilized at a 5% capacity in order to simulate a larger network load in a SAN environment 200. For instance, 95% of memory 120 space may be blocked, unutilized, etc. In another implementation, the administrator may indicate that a SAN switch 220 CPU 101 is to be utilized at a 10% capacity. Because the utilizations of e.g., CPU 101 and memory 120 are limited, a similar network load adds a greater the amount of computational stress to the switch 220 and effectively emulates a larger load at full utilizations.

In another implementation, the administrator may indicate a limited number of buffer credits are to be utilized to simulate a larger network load in a SAN environment 200. A buffer credit generally allows data communication in a Fibre Channel SAN. Latency may impose a distance limitation of a few kilometers between the source and the destination in the network. If the length of the fiber optic cable span exceeds this threshold, the throughput drops sharply. The buffer credit method allows the use of offsite storage facilities hundreds of kilometers away. In typically buffer credit flow control, a SAN 200 source and SAN 200 destination set the number of unacknowledged frames (buffer credits) allowed accumulating before the SAN 200 source stops sending data. A counter at the SAN 200 source keeps track of the number of buffer credits. Each time a frame is sent by the SAN 200 source, the counter increments by 1. Each time the SAN 200 destination receives a frame, it sends an acknowledgment back to the SAN 200 source, which decrements the counter by 1. If the number of buffer credits reaches the maximum, the SAN 200 source stops transmission until it receives the next acknowledgement from the SAN 200 destination. In embodiments, buffer credit starvation occurs when the transmitting port 222 runs out of buffer credits and isn't allowed to send frames. As such, the frames will be stored within the switch 220, buffer 210 and eventually have to be dropped if they can't be sent for a certain time. By limiting the number of available buffer credits, the administrator may cause the filling of buffer 210 and may effectively simulate a larger network load. For example, the administrator may indicate that only 20% of the recommended, maximum, minimum, etc. number of buffer credits may be utilized by switch 220 to process network traffic within the SAN test period.

In another implementation the administrator may limit the number of PODs to simulate a larger network load in a SAN environment 200. Some switches 220 may utilize POD wherein a certain number of ports 222 (e.g., 8 ports) are typically used and additional ports 222 (e.g. 16 ports, etc.) are dynamically activated and may be used to process increasing network loads. By limiting the number of available PODs, the administrator may cause a minimal number of ports 222 to process traffic and therefore may simulate a larger network load. For example, the administrator may indicate that a maximum number (e.g., 20% of the ports 222, etc.) may be utilized to process network traffic.

Figure 7:
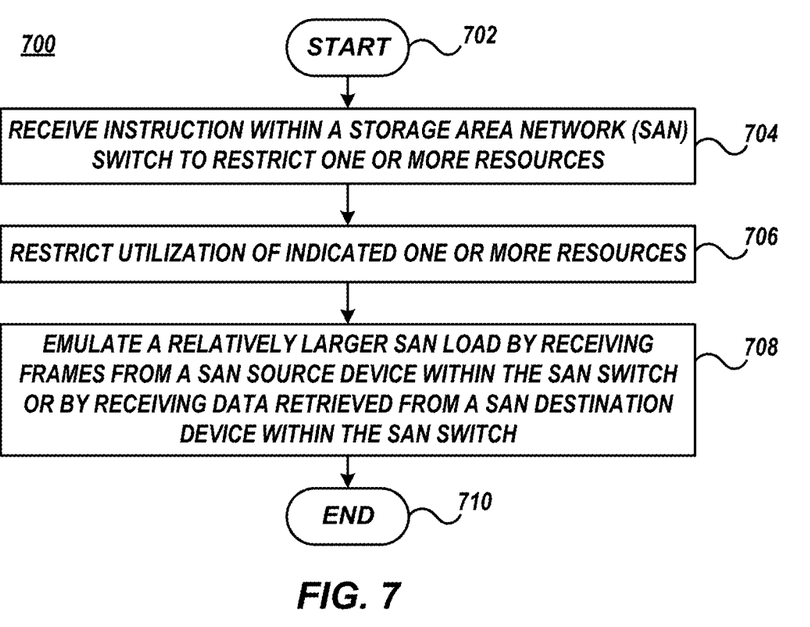
FIG. 7 illustrates an exemplary process for simulating a large network load, according to various embodiments of the present invention.

FIG. 7 illustrates an exemplary process 700 for simulating a large network load. Process 700 may be utilized to, for example, stimulate a large network load upon a SAN switch 220 by restricting usage of switch 220 resources to process a network load. For example, the size of buffer 210 may be limited to enable a smaller load to stress the SAN switch 220 to mimic a relatively larger load with a full side buffer. The restricted buffer may inhibit the SAN switch 220 from delivering frames, resulting in the filling of the buffer and corresponding computational stress. The emulated load allows for an all ports 222 of the SAN switch 220 to be simultaneously tested without the need or expense of a large number computing devices within the SAN environment 200.

Process 700 begins at block 702 and continues with a SAN switch 220, a group of SAN switches 220, a chassis 300, etc. receiving an instruction from a SAN test application to restrict one or more resources (block 704). For example, the SAN test application may be implemented upon computer 100-A that is communicatively connected to the SAN switch 220 and may instruct the switch 220 to restrict it's, e.g., number of ports 222 that may be utilized, the size of buffer 210, the available memory 120 space, the capacity of CPU 101, the number of buffer credits, etc. In another example, a SAN user may invoke a test environment by inputting a key code, authorization, license, etc. received by a SAN device to display the SAN test application that allows the throttling of resources prior to the SAN device receiving the instruction from the SAN test application to restrict one or more resources. In this way, the SAN test application may be enable by an entity with proper authorization to limit resources within the SAN environment 200.

Process 700 may continue with the SAN device restricting the utilization of the specified resource as identified by the received instruction (block 706). For example, the SAN test application may hold, block, decrease, etc. a portion of the resource in a not available or reserve mode for the duration of the test period and allowing the utilization of the remaining portion of the indicated resource. For example, 5% of the buffer 210 may be utilized and 95% of the buffer 210 may be blocked from being utilized. The enforcement of such resource throttling may be achieved by local controllers (e.g. controller 212, etc.), CPU 101, resource management or control applications, etc.

Method 700 may continue by emulating a relatively larger load by buffering or otherwise storing subsequent frames received from a source device within the SAN environment 200 within the restricted SAN device and/or buffering or otherwise storing subsequent frames retrieved from a destination device within the SAN environment 200 within the restricted SAN device (block 708). For example, a Fibre Channel frame may be sent from respective transmit modules 204A from one or more source computers and received upon a plurality of ports 222 of switch 220 that includes a resource having it's utilization restricted. The frames may be temporarily stored within buffer 210 space and delivered via one or more ports 222 to a receive module 204B of one or more destination computers. The restricted resource causes relatively increased computational stress. In this manner, a relatively smaller load may produce a stress normally achieved with much larger loads. Method 700 ends at block 710.

Figure 8:
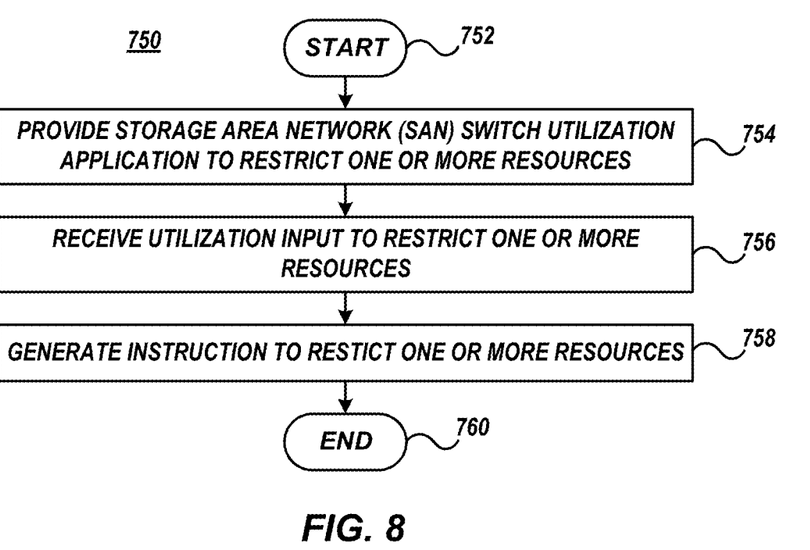
FIG. 8 illustrates an exemplary process for a SAN device to generate an instruction to simulate a large network load, according to various embodiments of the present invention.

FIG. 8 illustrates an exemplary process 750 for a SAN device to generate an instruction to simulate a large network load. Process 750 may be utilized by a SAN device, such as computer 100-A to instruct a SAN switch 220 to limit or restrict one or more switch 220 resources. Process 750 begins at block 752 and continues with a SAN device providing a SAN test application wherein an administrator may identify one or more resources and may indicate a utilization metric to restrict the utilization of the identified resource (block 754). For example, computer 100-A may display an interface 400, 500 upon I/O device 121.

Process 750 may continue with the SAN device receiving the utilization metric to restrict the utilization of the identified resource (block 756). For example, the application may receive the metric to restrict the availability of buffer 210 to 20% of its overall size. Process 750 may continue with the application generating an instruction that identifies the resource to be restricted and the extent of the restriction (block 758). Process 750 ends at block 760.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of simulating a large storage area network (SAN) load comprising:

provide a SAN switch test application upon a graphical user interface (GUI) displayed upon a test manager device that tests the SAN switch, wherein the SAN switch test application provides a visual icon associated with a partition of a buffer of the SAN switch to restrict the utilization of the partition by a SAN switch port, assigned to the partition;

receiving via the SAN switch test application a utilization metric at the visual icon that specifies a size of a first portion of the partition that buffers frames received upon the SAN switch port and specifies a size of a second portion of the partition that is blocked from buffering frames received upon the SAN switch port;

generating an instruction within the SAN switch test application that identifies the partition and the utilization metric associated with the partition;

receiving the instruction at the SAN switch;

restricting the utilization of the partition as enumerated by the utilization metric by blocking the second portion of the partition from buffering frames received upon the SAN switch port and allowing the first portion of the partition to buffer frames received upon the SAN switch port;

subsequently receiving a plurality of frames upon the SAN switch port; and emulating a large SAN load by buffering the subsequently received plurality of frames within the first portion of the partition and blocking the subsequently received frames from being buffered within the second portion of the partition.

2. The method of claim 1, wherein the plurality of frames are Fibre Channel frames.

3. A computer program product for simulating a large storage area network (SAN) load, the computer program product comprising one or more computer readable storage mediums having program instructions embodied therewith, the program instructions readable:

by a test manager device to provide a SAN switch test application that tests a SAN switch, the SAN switch test application comprising a displayed graphical user interface (GUI) upon the test manager device, wherein the SAN switch test application provides a visual icon associated with a partition of a buffer of the SAN switch to restrict the utilization of the partition by an assigned SAN switch port;

by the test manager device to receive a utilization metric at the visual icon of the GUI that specifies a size of a first portion of the partition that buffers frames received upon SAN switch port and specifies a size of a second portion of the partition that is blocked from buffering frames received upon the SAN switch port;

by the test manager device to generate an instruction within the SAN switch test application that identifies the partition and the utilization metric associated with the partition;

by the SAN switch to receive the instruction;

by the tested SAN switch to restrict the utilization of the partition as enumerated by the utilization metric by blocking the utilization of the second portion of the partition from buffering frames received upon the SAN switch port and allowing the first portion of the partition to buffer frames received upon the SAN switch port;

by the tested SAN switch to subsequently receive a plurality of frames upon the SAN switch port; and by the tested SAN switch to emulate a large SAN load by buffering the subsequently received frames within the first portion of the partition and blocking the subsequently received frames from being buffered within the second portion of the partition.

* * * * *